United States Patent [19]
Kuivamaki

[11] Patent Number: 5,853,165
[45] Date of Patent: Dec. 29, 1998

[54] CHAIN HOIST WITH A CLUTCH ADJUSTABLE BY MEANS OF THE BRAKE

[75] Inventor: Ismo Kuivamaki, Vantaas, Finland

[73] Assignees: R. Stahl Fordertechnik GmbH, Kunzelsau, Germany; KCI Konecranes International PLC, Hyvinkaa, Finland

[21] Appl. No.: 607,889

[22] Filed: Feb. 27, 1996

[30] Foreign Application Priority Data

Mar. 2, 1995 [DE] Germany .................. 195 07 191.3

[51] Int. Cl.⁶ .................................................. B66D 1/14
[52] U.S. Cl. .................... 254/366; 254/362; 254/372; 192/90; 475/331; 475/149
[58] Field of Search ................... 254/362, 347, 254/366, 372, 376; 192/90; 475/331, 149

[56] References Cited

U.S. PATENT DOCUMENTS

| | | | |
|---|---|---|---|
| 2,947,393 | 8/1960 | Grover | 192/18 |
| 3,016,118 | 1/1962 | Zatsky | 192/18 |
| 3,399,867 | 9/1968 | Schroeder | 254/346 X |
| 3,756,359 | 9/1973 | Suez et al. | 254/347 X |
| 3,853,303 | 12/1974 | Wineburner | 254/347 X |

FOREIGN PATENT DOCUMENTS

| | | | |
|---|---|---|---|
| 704675 | 3/1965 | Canada | 254/362 |
| B 10 45 742 | 12/1958 | Germany . | |
| 33 30 560 A1 | 3/1984 | Germany . | |
| 37 10 332 C1 | 7/1988 | Germany . | |
| 44 08 578 A1 | 3/1994 | Germany . | |

*Primary Examiner*—Donald P. Walsh
*Assistant Examiner*—Emmanuel M. Marcelo
*Attorney, Agent, or Firm*—Nilles & Nilles SC

[57] ABSTRACT

A chain hoist contains a slipping overload clutch in the drive line which connects the electric motor to the chain sprocket. This slipping clutch has two clutch halves which are in frictional engagement with one another and are preloaded into frictional engagement with one another by a spring. A holding brake is furthermore provided and this holding brake acts against the clutch disks so as to increase the frictional grip between the clutch disks in the applied state. This ensures that when the hoist is started and the disengagement of the brake is delayed, the slipping clutch does not enter the slipping state.

18 Claims, 3 Drawing Sheets

CHAIN HOIST WITH A CLUTCH ADJUSTABLE BY MEANS OF THE BRAKE

BACKGROUND OF THE INVENTION

DE-A-33 30 560 discloses an electric chain hoist. This electric chain hoist contains, in a housing, an induction motor which is provided with a cylindrical armature and, via a slipping clutch, drives a gear input shaft. The output shaft of the gear is coupled in torsionally rigid fashion to the chain sprocket of the electric chain hoist.

At the end of the armature remote from the gear input shaft there is a cone brake which is preloaded into the braking position by a spring. To release the brake, a solenoid plunger is provided. This solenoid plunger is coaxial with the motor armature and is attracted when the motor is set in rotation.

Owing to the arrangement, the brake acts via the slipping clutch and consequently cannot generate a greater braking torque for the chain than the maximum that the slipping clutch will allow. Since static friction is generally greater than sliding friction, a situation may arise in which the hoist is no longer able to hold a load hanging from the hook, even though the brake is engaged, because the clutch is slipping. Such a situation can arise if, when raising the load, the clutch is initially operated in the static friction range but, because of a fault, for example temporary entanglement of the load with an object, or due to longitudinal vibrations in the chain, the torque limit of the slipping clutch is then exceeded and the clutch passes into the state of sliding friction. Even if the armature is then stopped and the holding brake is applied, the load continues to fall since the slipping clutch may no longer be able to return to the state of static friction from the state of sliding friction.

It is therefore expedient to place the brake in that part of the drive line of the hoist which comes after the slipping clutch, taking the motor as the starting point.

One such solution is, for example, known from DE-A-44 08 578, which is not a prior publication. The braking torque can be set independently of the slipping torque of the slipping clutch and, as a result, the hoist is capable of holding loads reliably even when the slipping clutch has already started to slip under limiting-load conditions.

With this solution, however, the time relationship between the starting of the motor and the release of the brake must be maintained with great precision. If, for example, the brake were released more rapidly than the motor can start up while raising a load, the load would initially sink before being raised by the motor. If, conversely, the motor started up first and the brake were released afterwards, the applied brake would cause the slipping clutch to slip and it would then be possible to raise only a relatively small load with the hoist, in accordance with the friction coefficient under conditions of sliding friction.

The solution given in DE-A-37 10 332 avoids this problem by using a sliding rotor motor which ensures synchronicity between the motor and the brake with absolute reliability. However, such sliding rotor motors with a conical armature are very expensive to manufacture.

OBJECTS AND SUMMARY OF THE INVENTION

Taking this state of affairs as a starting point, it is an object of the invention to provide a hoist in which the braking torque is independent of the set slipping torque of the slipping clutch and in which there is no danger that the brake will cause the slipping clutch to slip.

According to the invention, this object is achieved by providing a chain hoist with a brake device, a slipping clutch, and a brake preloading device which, in a non-released state thereof, exerts an additional force on clutch members of the slipping clutch that increases the preloading force acting on the clutch members.

In the case of the novel hoist, the brake acts on that part of the drive line which comes after the slipping clutch, taking the motor as the starting point. An appropriate structural configuration ensures that the device which generates the brake preloading simultaneously acts on the slipping clutch as well. When the brake is not released, this measure increases the maximum slipping torque of the slipping clutch. Given appropriate dimensioning, it is possible to ensure that, with the brake not released and the motor current switched on, the slipping clutch remains in the state of static friction and blocks the starting of the motor. When, starting from this state, the brake is released, the hoist starts with a slipping clutch which is, as before, in a state of static friction, that is to say in a state in which it can transmit the higher torque.

The timing of the switching on of the motor current and of the release of the brake is consequently relatively uncritical. The only condition to be met is that the brake should only be released after the motor current has been switched on. In the case of the novel solution, the response times of the brake no longer have to be taken into account. This time, in particular, is subject to considerable scatter as between one unit and another and depends to a considerable extent on the over-voltage with which, in a magnetically operated brake, the brake magnet is excited. Thus, given otherwise constant conditions, the response times of the brake fluctuate with the instantaneous mains voltage, and this could sometimes lead, in the case of the known solutions—depending on how high the mains voltage is—to the hoist starting with a slipping clutch, while, in the case of the novel solution, it is always possible to ensure that the hoist starts with a clutch which does not slip.

Matters are made very simple in structural terms if, from the point of view of the brake, the slipping clutch is designed as a two-part brake disk, with the result that the contact force of the clutch disks is automatically increased when the brake is applied. Such an arrangement can be achieved if the output-side clutch member, of which there is at least one, is simultaneously the rotatable brake member, of which there is at least one, or is coupled to the latter in torsionally rigid fashion.

Conditions which can be reproduced very accurately can be achieved if the braking surfaces are flat surfaces.

Premature wear of the friction surfaces, on the one hand, and complexity of assembly, on the other hand, can be avoided if either the clutch device or the brake device is mounted in such a way that it can float axially but is otherwise free from tilting. Given floating mounting of the clutch device, said device can centre itself axially in an appropriate manner between the braking surfaces when the brake is applied, or, conversely, given an axially fixed clutch device, the entire brake device can be displaced axially in an appropriate manner. The tilt-free floating mounting prevents scoring of individual parts of the friction surfaces with the brake released.

BRIEF DESCRIPTION OF THE DRAWINGS

In addition, further developments of the invention form the subject-matter of subclaims.

Exemplary embodiments of the subject-matter of the invention are illustrated in the drawing, in which.

DETAILED DESCRIPTION OF THE PREFERRED EMBODIMENT

Figure 1:
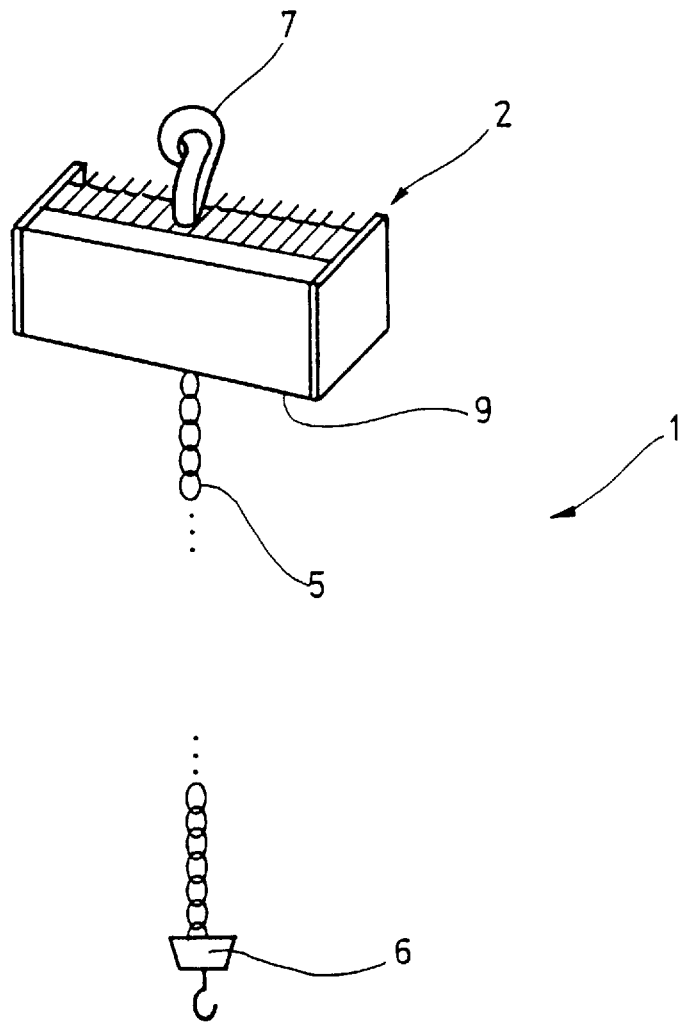
FIG. 1 shows a chain hoist in a perspective representation.
Figure 2:
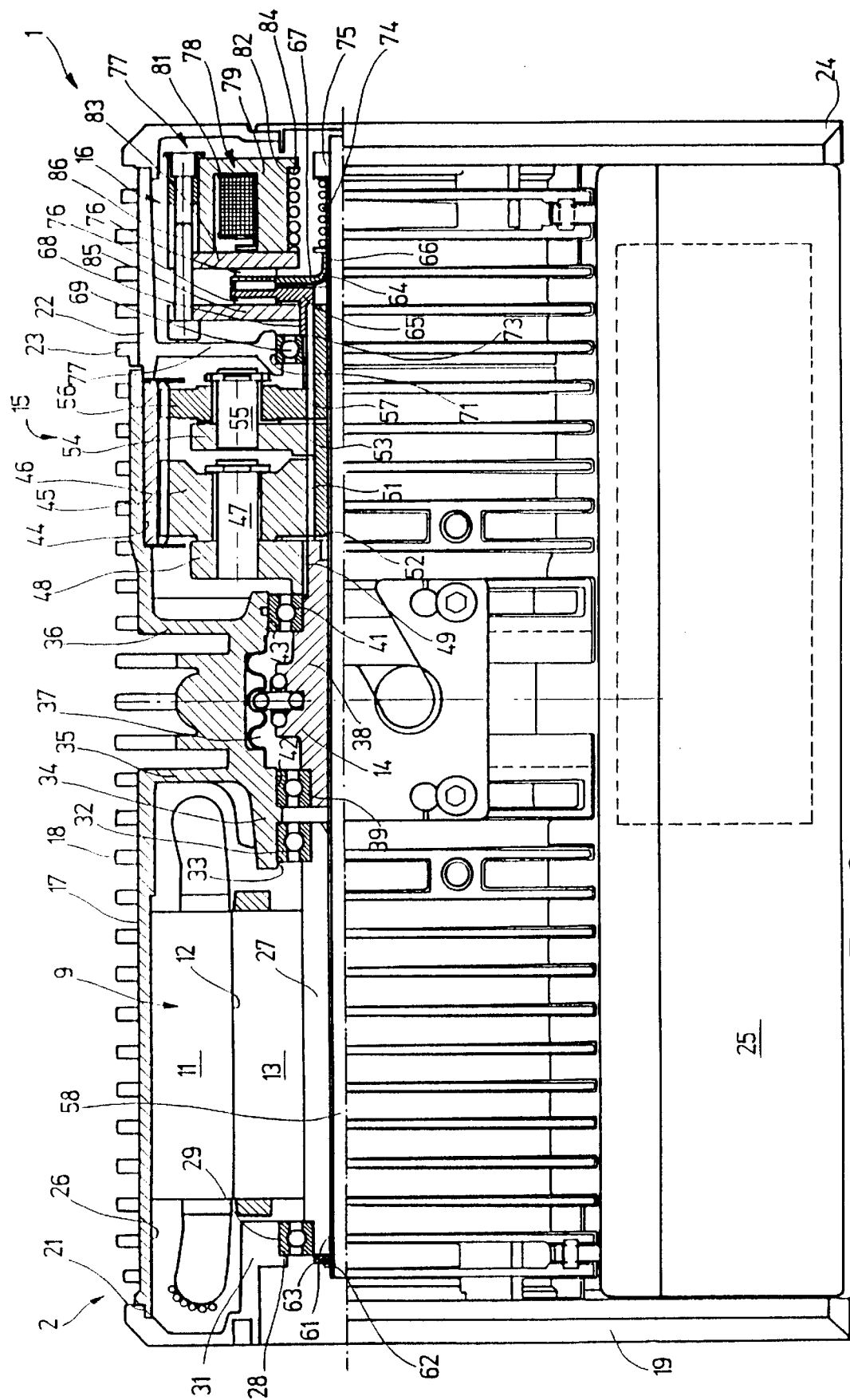
FIG. 2 shows the chain hoist shown in FIG. 1 in a partial longitudinal section.

FIG. 1 shows, in highly schematized form, a chain hoist 1 with a housing 2 in which there is arranged a drive mechanism (FIG. 2). Emerging from the underside is a round-link chain 5, to the bottom end of which a hook tackle 6 is attached. The chain hoist 1 is attached to a fixed structure (not shown) by means of a hook 7.

As the section shown in FIG. 2 shows, the drive mechanism comprises an asynchronous motor 9 with a field winding 11, in the cylindrical hole 12 of which there runs a cylindrical cage rotor 13. The drive mechanism also includes a chain sprocket 14, visible only in section, on that side of which is remote from the motor 9 there is arranged a two-stage planetary gear 15. Next to the two-stage planetary gear 15 there is a combined clutch and brake device 16, which is situated in the drive line between the motor 9 and the chain sprocket 14. The clutch device divides the drive line into two sections.

The housing 2 of the chain hoist 1 comprises a central piece 17 which, on its outer circumferential surface, bears ribs 18 which run in the circumferential direction and, as seen in the transverse direction, impart to the housing 2 an approximately rectangular outline. By virtue of the ribs 18, the housing 2 has a constant and continuous external shape along its length while, in fact, the actual body of the housing is essentially tubular.

The left-hand end of the central piece 17 is closed off by means of a cover 19 which is held in the correct position on the central piece 17 by complementary centering shoulders 21. Adjoining the central piece 17 at the right-hand end is a brake housing 22 with the same external shape in outline, in which the brake device 16 is accommodated. The brake housing 22 is likewise provided with corresponding cooling ribs 23 which lie in the circumferential direction.

That end of the brake housing 22 which is remote from the central piece 17 is closed off by another end cover 24, which is essentially a mirror image of end cover 19.

Both end covers 19 and 24 project laterally beyond the housing 2 on the same side, thereby forming an approximately C-shaped side opening. Accommodated in this side opening is a control housing 25 which contains connection terminals, contactors, electronic control systems and the like (not shown). The projecting covers 19, 24 at the sides protect the control housing 25, which is generally made of a plastic, and balance the chain hoist 1 in relation to its longitudinal axis. If the weight of the covers 19, 24 is not sufficient, additional weights can be mounted in the covers 19, 24.

Leading from end cover 19 into the central piece 17 is a circular hole 26 into which the core assembly of the stator 11 is shrink-fitted, being held fast by friction. The armature 13 is seated in torsionally rigid fashion on a hollow shaft 27 which is supported at the left-hand end by means of a deep-groove ball bearing 28 seated in a cylindrical bearing hole 29 coaxial with hole 26. This hole 29 is situated in an inward-pointing tubular extension 31 of end cover 19. To support the other end of the hollow shaft 27 there is a deep-groove ball bearing 32 which is in a wringing fit in a bearing hole 33. The bearing hole 33 is situated in a tubular extension 34 which projects into hole 26 from a dividing wall 35 formed integrally in the central piece 17.

At a distance from the dividing wall 35, the central piece 17 contains another dividing wall 36, a chain-sprocket housing 37 thereby being partitioned off between the two dividing walls 35 and 36. The chain sprocket 14 which runs within it is of integral construction with a hollow shaft 38 which is mounted rotatably on both sides of the chain sprocket 14 in two deep-groove ball bearings 39 and 41. The two deep-groove ball bearings 39 and 41 are mounted in associated bearing holes 42 and 43. Bearing hole 42 is arranged in the tubular extension 34 in coaxial alignment with bearing hole 33, while bearing hole 43 is arranged in a corresponding boss on dividing wall 36. The diameter of bearing hole 43 is chosen such that both deep-groove ball bearing 39 and the chain sprocket 14 can be inserted from the right in FIG. 2, since the diameter of bearing hole 43 is greater than the maximum diameter of the chain sprocket 14.

To the right of dividing wall 36, the interior of the housing 2 widens, and in this area of the housing there is a hole 44 which is coaxial with bearing holes 42 and 43 and into which is shrink-fitted an internal gearwheel 45 common to both stages of the two-stage planetary gear 15. The stage adjacent to the chain sprocket 14 comprises three planet wheels 46, which are rotatably mounted on spindles 47 of an associated planet carrier 48 and mesh with the internal gearwheel 45. The planet carrier 48 is connected in torsionally rigid fashion by means of tooth profiling 49 to a stub of the hollow shaft 38, said stub projecting beyond deep-groove ball bearing 41 on the right-hand side.

By means of the three planet wheels 46 of the second stage, the sun wheel 51 of this stage is supported in such a way as to be able to float. The length of the sun wheel 51 is greater than the width of the planet wheels 46, with the result that it projects beyond the planet wheels 46 on the right-hand side when it runs up against the adjacent end of the shaft 38 on the left-hand side, with which it makes contact via a washer 52. The projecting part of the sun wheel 51 projects into a hole 53 with complementary teeth in a planet carrier 54 of the first stage of the two-stage planetary gear 15. Seated on the spindles 55 of the planet carrier there are, once again, a total of three planet wheels 56 which support an associated sun wheel 57 in such a way that it can float, this sun wheel likewise projecting on the right-hand side and protruding into the brake housing 22.

The kinematic connection between the motor 9 and the planetary gear 15 is made by means of a stub shaft or intermediate shaft 58 provided on its outside with continuous tooth profiling. In the left-hand end of the hollow shaft 27 of the armature 13 there is a section 61 provided with tooth profiling, this section being complementary with the tooth profiling of the stub shaft 58. From here, the stub shaft 58 passes through hollow shaft 27, through the hollow shaft 38 of the chain sprocket 14, and from there through the hollow sun wheel 51 and through sun wheel 57 into the clutch and brake unit 16. At its left-hand, motor-side end, the stub shaft 58 is secured axially in the rightward direction by a snap ring 62 seated in a corresponding groove, which snap ring is supported by way of a shim 63 against the end of the hollow shaft 27. Otherwise, the stub shaft 58 is free to rotate relative to sun wheel 51, sun wheel 57 and the chain-sprocket shaft 38.

The combined clutch and brake unit 16 has two mutually parallel, flat and annular clutch disks 64 and 65, which are in frictional engagement with one another, for which purpose, as illustrated, they carry appropriate friction facings. For reasons connected with heat, it is advantageous to make the clutch disk 64 or 65 which does not have a friction facing relatively thick in order to give it a large heat capacity and thereby ensure that the clutch can rub for a relatively long time without damaging the friction facing. Instead of the flat configuration of clutch disks 64 and 65 which is illustrated, they can also carry conical friction surfaces.

Clutch disk 64 is the driven disk, for which reason it is provided with a hub 66 which is coupled to the stub shaft 58 by means of tooth profiling complementary with the tooth profiling of the stub shaft 58 in such a way that it can be displaced axially on the stub shaft but is coupled in torsionally rigid fashion to the stub shaft 58. The other clutch disk, clutch disk 65, is the output-side clutch disk, which is freely rotatable relative to the stub shaft 58 for which purpose a bearing ring 67 is provided on the profile of the stub shaft 58. Clutch disk 65 is likewise provided with a hub 68, and this hub 68 bears internal toothing corresponding to the external toothing of sun wheel 57. As illustrated, sun wheel 57 is extended in the direction of the clutch and brake unit 16 and, with this extended portion, projects into the hub 68 of clutch disk 65. In this way, an axially displaceable but torsionally rigid connection is established between clutch disk 65 and sun wheel 57.

Support for the clutch disk 65 is provided by means of a ball bearing 69 which is seated in a hole 71 in a dividing wall 72 of the brake housing 22. The hub 68 is rotatably mounted in this deep-groove ball bearing 69. The bearing hole 71 for the ball bearing 69 is provided with an abutment shoulder, and the hub 68 also bears an abutment shoulder 73, with the result that an axial force acting on clutch disk 65 from right to left can be introduced into the housing 2 by these shoulders.

In order to generate the preload by means of which the two clutch disks 64 and 65 are held in frictional engagement, a helical spring 74, acting as a compression spring which can be preloaded by means of a nut 75 screwed onto a corresponding thread on the stub shaft 58, is seated on a portion of the stub shaft 58 which projects beyond clutch disk 64 on the right-hand side. There may be shims between the nut 75 and the spring 74, on the one hand, and between the spring 74 and the hub 66 of clutch disk 64, on the other hand. Although these are illustrated in the drawing, they do not bear reference numerals.

The two clutch disks 64 and 65 are brake disks, for which reason they are provided with brake linings 76 on their outward-facing surfaces, i.e. the surfaces facing away from one another. The diameter of these brake linings matches the diameters of the clutch linings of clutch disks 64 or 65. These brake linings 76 interact with a fixed brake device 77. This fixed brake device 77 comprises an electromagnet 78 which is axially displaceable in the brake housing 22 and which has a cup-shaped iron yoke 79 and a magnet winding 81 located therein. The iron yoke 79 is secured against rotation in the brake housing 22 by means of guide grooves in the housing in which corresponding extensions of the iron yoke 79 are accommodated in sliding manner.

The iron yoke 79 is arranged in such a way that its open end faces in the direction of the two clutch disks 64 and 65. The iron yoke 79 also contains a through hole 82 through which the stub shaft 58 projects.

Arranged in front of the opening of the iron yoke 79 is an annular brake backplate 83 which is preloaded in the direction of clutch disk 64 by means of a helical compression spring 84. This spring 84, is supported against an opposing rearward shoulder of the hole 82. There is another annular brake backplate 85 between clutch disk 65 and dividing wall 72. This brake back plate 85 is connected to the yoke 79 in a manner which prevents rotation but allows axial displacement by means of a plurality of screws 86. For this purpose, the yoke 79 contains threaded bushes into which the screws 86 are screwed.

Figure 3:
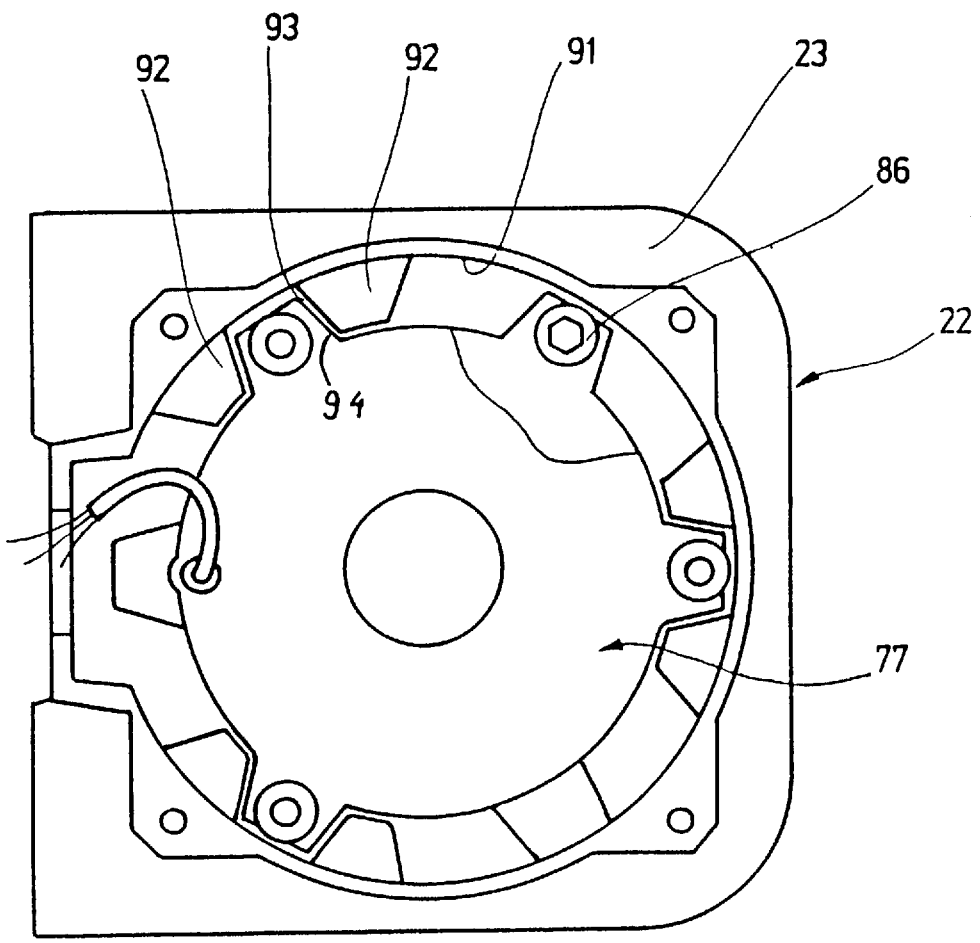
FIG. 3 shows an end view of the clutch and brake unit.

Finally, FIG. 3 shows an end view of the rear side of the brake device 77. As can be seen there, the brake housing 22 has on its inside 91 a multiplicity of ribs 92 which extend parallel to the axis of the stub shaft 58 and respective pairs of which delimit grooves 93. Located in a longitudinally displaceable fashion in these grooves 93 are extensions 94 which are provided on the magnet yoke 79, brake backplate 83 and brake backplate 85. The interaction of these extensions 94 with the grooves 93 secures the brake unit 77 against rotation in the brake housing 22 and, with the brake released, prevents it from tilting to such an extent that non-uniform wear could occur in the lower area of the brake backplates 83 and 85.

The chain hoist 1 described thus far is assembled as follows:

The holes 26, 44 and the bearing holes 33, 42 and 43, including the shoulder 21 on which the bearing cover 19 is subsequently seated, are first of all machined coaxially with one another and inserted in fully finished form into the unfinished casting. The stator 11 and the internal gearwheel 45 are then shrink-fitted into the associated holes 26 and 44 in the central piece 17.

Once this has been done, bearing 32, followed by the armature 13 together with its hollow shaft 27, are inserted. The bearing cover 19 together with the bearing 29 seated therein are then attached to the central piece 17 of the housing.

This is followed by insertion of the chain sprocket 14, which, as mentioned above, is in one piece with its associated shaft 38, and insertion of bearings 39 and 41. The planetary gear 15 is then installed and the brake housing 22 mounted thereon. The preassembled clutch and brake unit 16 can then be secured in the brake housing 22.

Assembly of the combined clutch and brake unit 16 is performed in parallel with the assembly operation described above. The procedure is as follows: after the insertion of the compression spring 84, brake backplate 83, clutch disk 64, clutch disk 65 and, finally, brake backplate 85 are placed on the magnet yoke 79 in the positions described. The screws 86 are then screwed into the magnet yoke 79. The screws 86 are screwed in until the desired air gap—which subsequently defines the release clearance when the brake is released—is achieved between the relevant end of the magnet yoke 79 and the directly adjacent brake backplate 83. The clutch and brake unit 16 thus preassembled is inserted with the hub 68 first into the ball bearing 69, the projecting portion of the sun wheel 57 simultaneously entering the hub 68.

As a final step, the stub shaft 58 is inserted from the motor side until it takes up the position shown in FIG. 2. The compression spring 74 is placed on the portion situated in the hole 82 in the magnet yoke 79 and is preloaded to the appropriate extent by means of the screwed-on nut 75.

As the final stage, the end cover 24 can be placed on, thereby completing the process of mechanical assembly in this respect.

The chain hoist described, in particular the combined brake and clutch unit 16, operates as follows:

From the compression spring 74, the force which serves to preload the two clutch disks 64 and 65 into frictional engagement with one another is transmitted to the nut 75, which transmits it to the stub shaft 58. The stub shaft 58 is supported against the hollow shaft 27 of the motor 9 via the snap ring 62. The axial force thus acting on the hollow shaft 27 is transmitted by deep-groove ball bearing 32 to the central piece 17 of the housing, which transmits the force to the dividing wall 72 of the brake housing 22. Resting against the dividing wall 72, on the corresponding shoulder, is ball bearing 69, against which the shoulder 73 of the hub 68 abuts. From the hub 68, the force transmission loop is completed via clutch disk 65, from which the force flows to clutch disk 64 and from there, via its hub 66, to compression spring 74. The force with which the two clutch disks 64 and 65 are in frictional engagement when no additional pressure force is acting on the two clutch disks 64 and 65 is thus generated with the aid of compression spring 74.

In the novel chain hoist, an additional force of this kind is generated by the compression spring 84 of the brake device 78. As can be seen from the FIG. 2, the two clutch disks 64 and 65 are seated between the two annular brake backplate 83 and 85. These two brake backplates 83 and 85 are preloaded towards one another by means of compression spring 84. The force of this compression spring 84 is transmitted to the magnet yoke 79 at the right-hand end of hole 82 via an annular shoulder which, although shown, has not been provided with a reference numeral. The force of compression spring 84 passes via the screws 86 and their heads to the left-hand brake backplate 85. Brake backplate 85 rests annularly against the brake lining 76 of clutch disk 65.

The pressure force caused by spring 84 passes via clutch disk 65 to clutch disk 64 and, from there, to brake backplate 83, which is supported in the region of its hole against compression spring 84.

Brake backplates 83 and 85 fit over the two clutch disks 64 and 65 like tongs, and the clutch 64 and 65 are additionally pressed together from the outside by a force corresponding to the preloading force of compression spring 84. When the electromagnet 78 is not excited, two springs act on the two clutch disks 64 and 65, namely compression spring 74 and compression spring 84. If, on the other hand, the electromagnet 78 is switched on, the action of compression spring 84 is removed from the two clutch disks 64 and 65. These are then preloaded into frictional engagement only to an extent corresponding to the preloading force of compression spring 74.

If, in this arrangement, the current for the motor 9 is switched on first, and the electromagnet 78 of the combined clutch and brake device 16 is switched on only after a delay, then, given appropriate dimensioning of the two compression springs 74 and 84, the preloading force between the two clutch disks 64 and 65 and the frictional grip between the clutch disk 64, which is coupled positively to the armature 13, and the adjacent brake backplate 85 is so great that the armature 13 remains locked. Only when, soon afterwards, the electromagnet 78 is switched on and brake backplate 83 is drawn against the magnet yoke 79 does the braking force disappear, allowing the motor 9 to impart rotation to the stub shaft 58. If the load hanging from the chain (not shown) is higher than the permissible limiting load, the chain sprocket 14 will also be set in motion via the planetary gear 15. If, on the other hand, the attached hook load is too large, the slipping clutch formed by the two clutch disks 64 and 65 slips, the slipping torque now being defined exclusively by the preload of compression spring 74.

The significant point here is that, owing to the arrangement chosen, the slipping clutch has in each case been in the state of static friction up to the release of the brake, i.e. the switching on of the electromagnet 78. Even if the electromagnet 78 is only switched on after the motor 9 is switched on, the slipping clutch never enters the state of sliding friction before this takes place. Irrespective of the time relationships, exactly reproducible conditions of frictional engagement between the two clutch disks 64 and 65 are thus established and, in particular, this does not depend on the delay with which the magnet 78 is switched on relative to the motor 9 or whether both are activated simultaneously.

On the other hand, the novel solution has the considerable advantage that the braking torque with which the chain sprocket 14 can be braked does not depend on the slipping torque of the safety clutch.

If there were too great a load hanging from the hook, 6 generating a higher torque between the two clutch disks 64 and 65 than that required to overcome the static friction between these two clutch disks 64 and 65 with the brake released, it would be possible to bring the load to a halt again at any time. It is sufficient for the operator to switch the chain hoist 1 off because the electromagnet 78 is then immediately deenergized, bringing compression spring 84 back into action and braking the two clutch disks 64 and 65 solidly, irrespective of the slipping torque set by means of compression spring 74.

Additional security is obtained in the solution indicated by the fact that both the input-side and the output-side clutch disk 64, 65 are each provided with their own brake lining 76, so that, even if the slipping clutch fails, reliable braking is guaranteed. Since both clutch disks 64 and 65 are provided with their own friction brake lining 76, each clutch disk 64, 65 is braked independently by the associated brake backplate 83 and 85, respectively, i.e. both the motor side and—even more importantly—the output side and hence the chain-sprocket side are braked solidly.

If, on the other hand, it were the output-side brake lining 76 of clutch disk 65 which failed while the clutch itself remained fully functional, reliable braking would still take place since the braking action would then be performed by means of clutch disk 64 and the static friction between the clutch disks 64 and 65, the frictional force of which with the brake unexcited has been significantly increased.

The floating mounting of the brake unit 78 is intended to ensure that both brake backplates 83 and 85 can be applied in the same way and that no bending forces occur at the two clutch disks 64 and 65.

Instead of mounting the brake unit 78 in a floating manner, it is also possible to arrange the two clutch disks 64 and 65 in a floating manner on the stub shaft 58 if the preloading between the two clutch disks 64 and 65 were produced by other measures. The arrangement shown has the advantage that the slipping or friction torque can be easily adjusted by means of the externally accessible nut 75.

I claim:

1. A chain hoist comprising:

a drive motor;

a gear which is coupled to the drive motor and which has at least one input shaft and one output shaft, wherein the gear is connected to a load-lifting device and, together with the drive motor and the load-lifting device, forms a drive line;

a brake device which acts on the drive line and which has at least one rotationally fixed brake member and at least one rotatable brake member which revolves with the drive line;

a releasable brake preloading device which is selectively movable 1) from a non-released state in which it preloads the rotatable brake member into frictional engagement with the rotationally fixed brake member 2) to a released state in which it does not preload the rotatable brake member into frictional engagement with the rotationally fixed brake member; and a slipping clutch which divides the drive line into two sections and which has at least one driven clutch member and at least one driving clutch member which are preloaded into frictional engagement with one another by a clutch preloading device;

wherein the brake preloading device is arranged in such a way that, in the non-released state thereof, the brake preloading device exerts an additional force on the clutch members, which increases the preloading force acting on the clutch members.

2. The hoist as claimed in claim 1, wherein the rotatable brake member is coupled in a torsionally rigid fashion to the driven clutch member.

3. The hoist as claimed in claim 1, wherein the rotatable brake member and the driven clutch member are integral with one another.

4. The hoist as claimed in claim 1, wherein the brake device has at least two rotationally fixed brake members.

5. The hoist as claimed in claim 1, wherein the slipping clutch is arranged between two rotationally fixed brake members.

6. The hoist as claimed in claim 1, wherein the rotationally fixed brake member has flat braking surfaces.

7. The hoist as claimed in claim 1, wherein the clutch members are disk-shaped.

8. The hoist as claimed in claim 7, wherein the clutch members have mutually facing surfaces which bear clutch surfaces, and wherein outward-facing surfaces of the clutch members are provided with braking surfaces.

9. The hoist as claimed in claim 1, wherein the brake preloading device comprises a spring.

10. The hoist as claimed in claim 9, further comprising a brake release device which acts counter to the spring.

11. The hoist as claimed in claim 1, wherein the drive motor acts on the input shaft of the gear via the slipping clutch.

12. The hoist as claimed in claim 1, wherein the slipping clutch is mounted in such a way that the slipping clutch floats axially in relation to shafts which are rotationally coupled to the slipping clutch.

13. The hoist as claimed in claim 1, wherein the rotationally fixed brake member is mounted in such a way that the rotationally fixed brake member floats parallel to an axis of rotation of the slipping clutch.

14. The hoist as claimed in claim 1, wherein the rotationally fixed brake member is guided in such a way in a direction parallel to an axis of rotation of the slipping clutch that the rotationally fixed brake member tilts in the released state of the brake device.

15. The hoist as claimed in claim 1, wherein the clutch preloading device comprises a spring.

16. The hoist as claimed in claim 1, further comprising a brake release device which comprises an electromagnet.

17. A chain hoist comprising:

a drive motor;

a gear which is coupled to the drive motor and which has at least one input shaft and one output shaft, wherein the gear is connected to a load-lifting device and, together with the drive motor and the load-lifting device, forms a drive line for lifting loads;

a brake device which acts on the drive line and which has at least one rotationally fixed brake member and at least one rotatable brake member which revolves with the drive line;

a releasable brake preloading device which biases the rotatable brake member into frictional engagement with the rotationally fixed brake member, said brake device disengaging to terminate a braking action against the biasing force of said brake preloading device;

a slipping clutch which divides the drive line into two sections and which has at least one driven clutch member and at least one driving clutch member;

a clutch preloading device which imposes a preloading force on the driven clutch member that biases the driven clutch member into engagement with the driving clutch member, said slipping clutch being arranged to automatically release against the force of said clutch preloading device when a release torque is imposed on said clutch that overcomes all preloading forces imposed on said clutch members;

wherein the brake preloading device is arranged in such a way that, in the non-released state thereof in which said brake preloading device imposes an engaging force on the brake device, the brake preloading device exerts an additional preloading force on the driven clutch member, and wherein the additional preloading force 1) supplements the preloading force imposed on the driven clutch member by the clutch preloading device and 2) increases the release torque which must be imposed on the slipping clutch to release the slipping clutch.

18. The hoist as claimed in claim 17, wherein the brake device and the slipping clutch are combined as an integral brake/clutch assembly sharing rotatable friction members.

* * * * *